(12) United States Patent
Ang

(10) Patent No.: US 8,773,065 B2
(45) Date of Patent: Jul. 8, 2014

(54) POWER SUPPLY SYSTEM FOR ELECTRIC POWERED VEHICLE, CONTROL METHOD THEREOF, AND ELECTRIC POWERED VEHICLE

(75) Inventor: Wanleng Ang, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/881,064

(22) PCT Filed: Nov. 10, 2010

(86) PCT No.: PCT/JP2010/070007
§ 371 (c)(1),
(2), (4) Date: Apr. 23, 2013

(87) PCT Pub. No.: WO2012/063331
PCT Pub. Date: May 18, 2012

(65) Prior Publication Data
US 2013/0221921 A1     Aug. 29, 2013

(51) Int. Cl.
*H02J 7/14*      (2006.01)
*H02J 7/00*      (2006.01)
*B60L 11/18*   (2006.01)

(52) U.S. Cl.
CPC ......... *B60L 11/1811* (2013.01); *B60L 11/1824* (2013.01); *B60L 11/1812* (2013.01)
USPC ........... 320/104; 320/109; 320/166; 320/134; 320/140

(58) Field of Classification Search
CPC ............ B60L 11/1811; B60L 11/1809; B60L 11/1812; B60L 11/1864
USPC ......... 320/104, 109, 137, 134, 136, 140, 166, 320/111, 135; 307/10.1
See application file for complete search history.

(56) References Cited

U.S. PATENT DOCUMENTS

| | | | | |
|---|---|---|---|---|
| 5,596,258 A | * | 1/1997 | Kimura et al. | 320/163 |
| 6,114,775 A | * | 9/2000 | Chung et al. | 307/10.1 |
| 7,388,353 B2 | * | 6/2008 | Kato et al. | 320/166 |
| 7,772,806 B2 | * | 8/2010 | Kitanaka | 320/140 |
| 2002/0190695 A1 | * | 12/2002 | Wall et al. | 322/17 |
| 2003/0029654 A1 | * | 2/2003 | Shimane et al. | 180/65.4 |
| 2010/0080022 A1 | * | 4/2010 | Schmidt | 363/53 |

(Continued)

FOREIGN PATENT DOCUMENTS

| | | |
|---|---|---|
| EP | 2 228 882 A2 | 9/2010 |
| JP | A-10-164709 | 6/1998 |

(Continued)

*Primary Examiner* — Edward Tso
*Assistant Examiner* — Alexis Boateng
(74) *Attorney, Agent, or Firm* — Oliff PLC

(57) ABSTRACT

A charger converting electric power from an external power supply into charging power for a power storage device converts AC power on a power line into charging power for an auxiliary battery. A CHR connects or disconnects a path between the charger and the power storage device. A DC/DC converter converts DC power on a power line connected to a smoothing capacitor into charging power for the auxiliary battery and outputs the power onto a power line. An ECU discharges the smoothing capacitor even if the voltage on the power line is lower than a determination voltage by causing the DC/DC converter to operate to charge the auxiliary battery in a discharging mode where the CHR is set OFF.

15 Claims, 9 Drawing Sheets

(56) References Cited

U.S. PATENT DOCUMENTS

| | | |
|---|---|---|
| 2010/0318252 A1* | 12/2010 | Izumi ............................ 701/22 |
| 2011/0018515 A1* | 1/2011 | McCloy-Stevens .......... 323/284 |
| 2011/0187184 A1 | 8/2011 | Ichikawa |
| 2011/0248563 A1* | 10/2011 | Komma et al. ................ 307/9.1 |
| 2012/0133204 A1 | 5/2012 | Ang et al. |

FOREIGN PATENT DOCUMENTS

| | | |
|---|---|---|
| JP | A-2009-225587 | 10/2009 |
| JP | A-2009-278822 | 11/2009 |
| JP | A-2010-213499 | 9/2010 |
| JP | B2-4984010 | 7/2012 |
| WO | WO 2012/049755 A1 | 4/2012 |

* cited by examiner

POWER SUPPLY SYSTEM FOR ELECTRIC POWERED VEHICLE, CONTROL METHOD THEREOF, AND ELECTRIC POWERED VEHICLE

TECHNICAL FIELD

The present invention relates to a power supply system for an electric powered vehicle, a method of controlling a power supply system, and an electric powered vehicle. More particularly, the present invention relates to an electrical system for an electric powered vehicle incorporating a main power storage device (high voltage) for feeding power to a traction motor, capable of charging by an external power supply, and a sub-power storage device (low voltage) for feeding power to an auxiliary machine,

BACKGROUND ART

For an electric powered vehicle such as an electric car or a hybrid vehicle that drives an electric motor for driving a vehicle by the electric power from a power storage device typically represented by a secondary battery, there is proposed a configuration of charging the power storage device by a power supply external to the vehicle (hereinafter, simply referred to as "external power supply". Hereinafter, charging of a power storage device by an external power supply will be also referred to as "external charging".

For example, Japanese Patent Laying-Open No. 2009-225587 (PTL 1) discloses a configuration of achieving improvement in the charging efficiency at the time of external charging together with ensuring the operation of the auxiliary machine load system. Specifically, there is disclosed a configuration of providing a main battery charging path by external charging so as to allow external charging and the operation of the auxiliary machine load system even if the relay between the electric motor for driving a vehicle and the main battery is OFF.

CITATION LIST

Patent Literature

PTL 1: Japanese Patent Laying-Open No. 2009-225587

SUMMARY OF INVENTION

Technical Problem

For external charging, a charger device for converting electric power supplied from an external power supply into the charging electric power for a vehicle-mounted power storage device represented by a secondary battery is required. In such a charger device, a capacitor to smooth the DC voltage is generally provided during or at the final stage of power conversion.

However, the stored charge will remain in the capacitor of the charger when external charging ends. Although PTL 1 describes an exemplified configuration of a charger, it is silent about how discharging of the capacitor is to be carried out.

In view of the foregoing, an object of the present invention is to execute discharging of a smoothing capacitor included in a charger efficiently in an electric powered vehicle mounted with a charger for charging a vehicle-mounted power storage device by an external power supply.

Solution To Problem

According to an aspect of the present invention, a power supply system for an electric powered vehicle includes a main power storage device and a sub-power storage device, a charger, and a power converter. The main power storage device stores electric power input and output with respect to an electric motor that generates vehicle driving power. The charger is configured including a smoothing capacitor such that electric power from the external power supply is converted to the charging power for the main power storage device. The output voltage from the sub-power storage device is lower than the output voltage from the main power storage device. The power converter is provided between the charger and the sub-power storage device, and configured to convert the power on a first power line connected to the smoothing capacitor into the charging power for the sub-power storage device. A control device controls the operation of the power converter based on the voltage on the first power line. The control device, in an external charging mode by the charger, causes the power converter to operate to charge the sub-power storage device when the voltage on the first power line is higher than a first determination voltage, and stops the power converter when the voltage on the first power line is lower than the first determination voltage, and in a discharging mode of the smoothing capacitor at the end of external charging, causes the power converter to operate to convert the stored charge in the smoothing capacitor into charging power for the sub-power storage device even when the voltage on the first power line becomes lower than the first determination voltage.

Preferably, the control device causes the power converter to operate such that the output voltage or output current to the sub-power storage device is constant when the voltage on the first power line is higher than the first determination voltage, and causes the power converter to operate such that the output current is maximum when the power converter is to be operated in the event of the voltage on the first power line being lower than the first determination voltage.

Further preferably, the power supply system further includes a second relay between the first power line and the sub-power storage device, connected bypassing the power converter. The control device sets the second relay ON when the voltage on the first power line becomes lower than a second determination voltage that is lower than the first determination voltage in the discharging mode.

Further preferably, the power supply system further includes a boost circuit boosting the voltage on the first power line for output to the input side of the power converter. The control device provides control such that the input voltage to the power converter becomes higher than the first determination voltage by the boost circuit when the power converter is to be operated in the event of the voltage on the first power line being lower than the first determination voltage.

Alternatively, the smoothing capacitor preferably includes a first capacitor connected to the first power line, and a second capacitor connected to a second power line different from the first power line. The charger includes a power conversion unit for carrying out DC power conversion between the first power line and second power line. The power conversion unit operates to convert the power on the second power line for output to the first power line in a discharging mode.

Preferably, the first determination voltage is determined corresponding to the lower limit of the rated input voltage range of the power converter.

Another aspect of the present invention is directed to a method of controlling a power supply system for an electric powered vehicle incorporating an electric motor that generates vehicle driving power. The power supply system includes a main power storage device and a sub-power storage device, a charger, and a power converter. The main power storage device stores electric power input and output with respect to an electric motor that generates vehicle driving power. The charger is configured including a smoothing capacitor such that electric power from the external power supply is converted to the charging power for the main power storage device. The output voltage from the sub-power storage device is lower than the output voltage from the main power storage device. The power converter is provided between the charger and the sub-power storage device, and configured to convert the electric power on a first power line connected with the smoothing capacitor into the charging power for the sub-power storage device. The method of controlling includes the steps of comparing the voltage on the first power line with a first determination voltage when operation of the power converter is instructed, causing the power converter to operate to charge the sub-power storage device when the voltage on the first power line is higher than the first determination voltage, causing the power converter to operate to convert the stored charge in the smoothing capacitor into the charging power for the sub-power storage device in a discharging mode of the smoothing capacitor at the end of external charging, when the voltage on the first power line is lower than the first determination voltage, and stopping the power converter in a mode other than the discharging mode when the voltage on the first power line is lower than the first determination voltage.

According to a further aspect of the present invention, an electric powered vehicle capable of charging by an external power supply includes an electric motor generating vehicle driving power, a main power storage device and a sub-power storage device, a charger, and a power converter. The main power storage device stores electric power input and output with respect to the electric motor. The charger is configured including a smoothing capacitor such that electric power from the external power supply is converted to the charging power for the main power storage device. The output voltage from the sub-power storage device is lower than the output voltage from the main power storage device. The power converter is provided between the charger and the sub-power storage device, and configured to convert the electric power on a first power line connected with the smoothing capacitor into the charging power for the sub-power storage device. A control device controls the operation of the power converter based on the voltage on the first power line. The control device causes, in an external charging mode by the charger, the power converter to operate to charge the sub-power storage device when the voltage on the first power line is higher than a first determination voltage, and stops the power converter when the voltage on the first power line is lower than the first determination voltage, and in a discharging mode of the smoothing capacitor at the end of external charging, causes the power converter to operate to convert the stored charge in the smoothing capacitor into charging power for the sub-power storage device even when the voltage on the first power line becomes lower than the first determination voltage.

Advantageous Effects of Invention

According to the present invention, the discharging of a smoothing capacitor in a charger can be executed efficiently in an electric powered vehicle incorporating a charger charging a vehicle-mounted power storage device by an external power supply.

DESCRIPTION OF EMBODIMENTS

Figure 1:
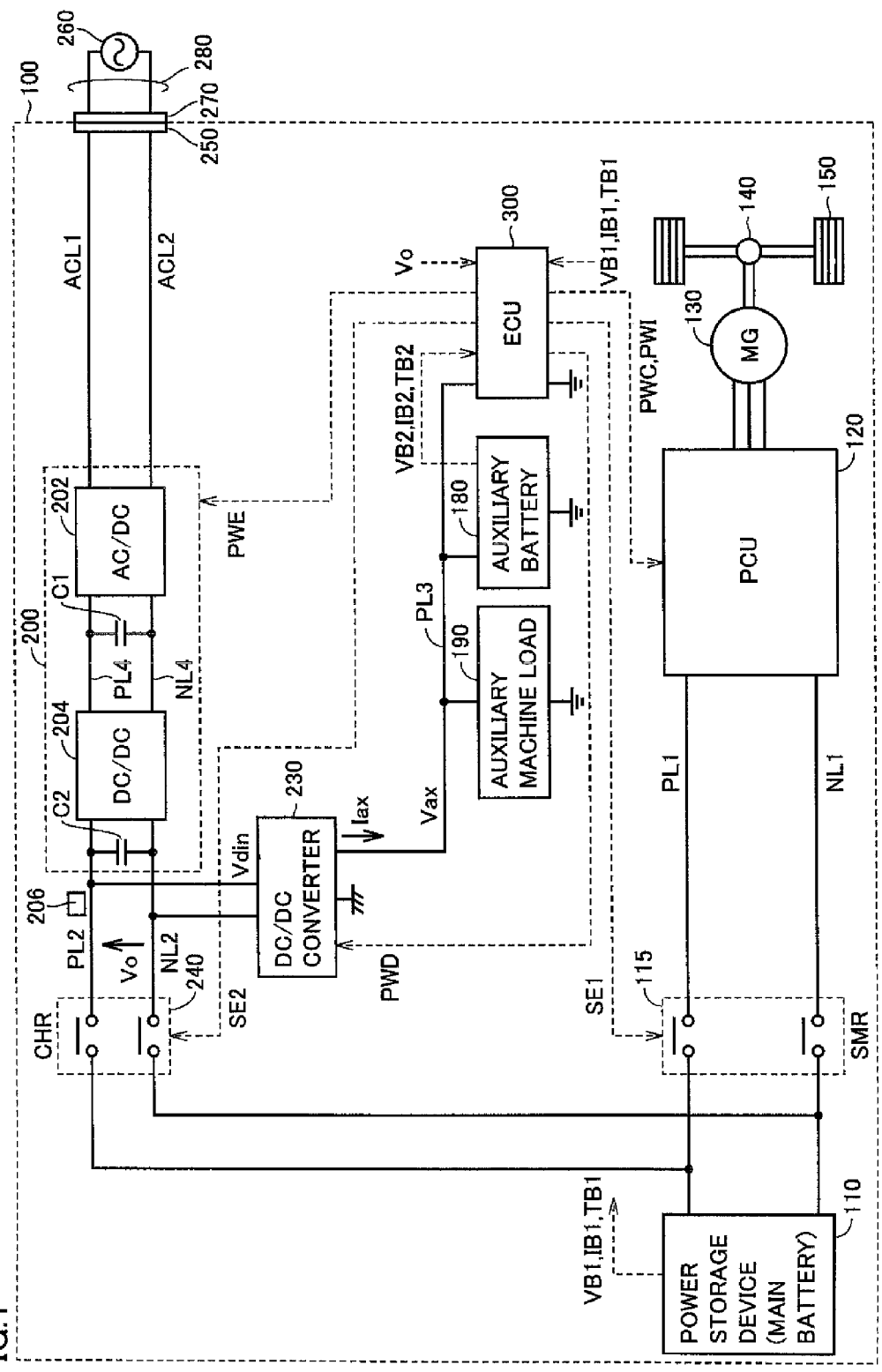
FIG. 1 is a block diagram representing a configuration of an electric powered vehicle including a power supply system according to a first embodiment of the present invention.

Embodiments of the present invention will be described in detail hereinafter with reference to the drawings. In the drawings, the same or corresponding elements have the same reference characters allotted, and description thereof is basically not repeated.

First Embodiment

FIG. 1 is a block diagram representing a configuration of an electric powered vehicle including a power supply system according to a first embodiment of the present invention.

Referring to FIG. 1, an electric powered vehicle 100 includes a power storage device 110 corresponding to a "main power storage device", a system main relay (hereinafter, also referred to as SMR) 115, a PCU (Power Control Unit) 120, a motor generator 130 that is a traction motor, a power transmission gear 140, a driving wheel 150, and a control device 300.

Power storage device 110 is an electric power storage element configured to enable charging/discharging, and is formed of a secondary battery typically represented by a lithium ion battery or nickel-metal hydride battery. The output voltage of power storage device 110 is approximately 200V, for example. Alternatively, power storage device 110 may be constituted of a storage element such as an electric double layer capacitor, or a combination of a storage element and a secondary battery.

Control device 300 is constituted of an electronic control unit including a CPU (Central Processing Unit), a memory device, and an input/output buffer, not shown. Control device 300 (hereinafter, also referred to as ECU 300) controls various devices incorporated in electric powered vehicle 100. The control is not restricted to processing by software, and processing is also allowed through dedicated hardware (electronic circuit).

Power storage device 110 is connected to a power line PL1 and a ground line NL1 via SMR 115. Power line PL1 and ground line NL1 are connected to PCU 120 for driving motor generator 130. Power storage device 110 supplies to PCU 120 the electric power for generating the driving force of electric powered vehicle 100. Power storage device 110 also stores the electric power generated at motor generator 130.

The relay included in SMR 115 has one end connected to the positive terminal and negative terminal of power storage device 110. The relay in SMR 115 has the other end connected to power line PL1 and ground line NL1 connected to PCU 120. SMR 115 switches between the supply and cut off of the electric power between power storage device 110 and PCU 120 based on a control signal SE1 from ECU 300.

Figure 2:
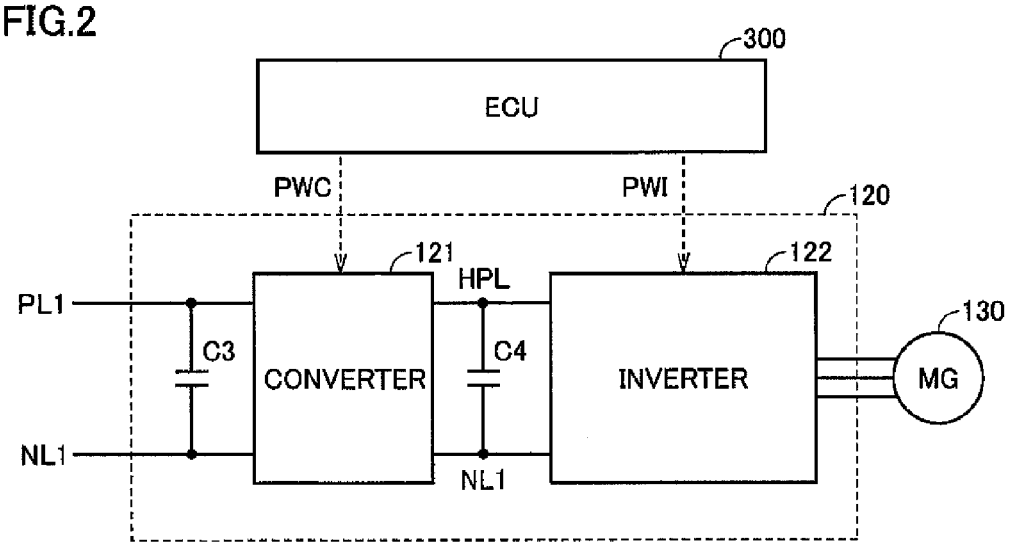
FIG. 2 is a block diagram of an exemplified configuration of the PCU shown in FIG. 1.

FIG. 2 represents an example of an internal configuration of PCU 120.

Referring to FIG. 2, PCU 120 includes a converter 121, an inverter 122, and smoothing capacitors C1 and C2.

Converter 121 carries out bidirectional power conversion from power line PL1 and ground line NL1 to power line HPL and ground line NL1 or from power line HPL and ground line NL1 to power line PL1 and ground line NL1 based on control signal PWC from ECU 300. For converter 121, the circuit configuration of a power conversion circuit capable of DC voltage conversion (for example, bidirectional chopper circuit) can be applied arbitrarily.

Inverter 122 is connected to power line HPL and ground line NL1. Based on a control signal PWI from ECU 300, inverter 122 converts the DC power supplied from converter 121 into AC power to drive motor generator 130. For inverter 122, the circuit configuration of a general 3-phase inverter may be applied.

Although a configuration having one pair of a motor generator and inverter is shown by way of example in the present embodiment, a configuration in which there are a plurality of pairs of the motor generator and inverter may be employed.

Smoothing capacitor C3 is provided between power line PL1 and ground line NL1 to reduce the voltage variation therebetween. Capacitor C4 is provided between power line HPL and ground line NL1 to reduce the voltage variation therebetween.

Referring to FIG. 1 again, motor generator 130 is an AC rotating electric machine such as a permanent magnet type synchronous electric motor including a rotor with a permanent magnet embedded.

The output torque from motor generator 130 is transmitted to driving wheel 150 via power transmission gear 140 constituted of a reduction gear and/or power split mechanism not shown. Electric powered vehicle 100 runs by the torque transmitted to driving wheel 150. In a regenerative braking mode of electric powered vehicle 100, motor generator 130 can generate power by the rotation force of driving wheel 150. The generated, electric power is converted into the charging power for power storage device 110 by PCU 120.

In a hybrid vehicle having an engine (not shown) incorporated in addition to motor generator 130, the required driving force for the vehicle is generated by the cooperative operation of the engine and motor generator 130. In this case, power storage device 110 can be charged using the electric power generated by the rotation of the engine.

Thus, electric powered vehicle 100 represents a vehicle incorporating an electric motor for generating the vehicle driving force, and is intended to include a hybrid vehicle generating a vehicle driving force by an engine and electric motor, as well as an electric car and fuel cell vehicle not incorporating an engine, or the like.

In the context of the configuration of electric powered vehicle 100 shown in FIG. 1, the elements other than motor generator 130, power transmission gear 140 and driving wheel 150 constitute the power supply system for the electric powered vehicle.

The power supply system further includes, as a configuration for power storage device 110 to be externally charged by the electric power from an external power supply 260 (external charge system), a charger 200, a charge relay 240, and a charge inlet 250. External power supply 260 is generally constituted of a commercial AC power supply.

To charge inlet 250 is connected a charge connector 270 of a charge cable 280 for electrically connecting external power supply 260 with electric powered vehicle 100. The electric power from external power supply 260 is transmitted to electric powered vehicle 100 via charge cable 280. A relay not shown is incorporated in charge cable 280, which is set ON in an external charging mode and set OFF when the external charging ends.

Charger 200 is connected to charge inlet 250 via power lines ACL1 and ACL2. Charger 200 is electrically connected with power storage device 110 via power line PL2 and ground line NL2, and a charge relay 240 (hereinafter, also referred to as CHR 240) set ON in an external charging mode.

CHR 240 is connected between the positive terminal of power storage device 110 and power line PL2, and between the negative terminal of power storage device 110 and ground line NL2. CHR 240 establishes or cuts the path between power storage device 110 and charger 200 based on a control signal SE2 from ECU 300.

In an external charging mode, an energizing path to charge power storage device 110 through the electric power from external power supply 260 is established in response to CHR 240 being set ON.

In a non-external charging mode, the apply of the output voltage from power storage device 110 to the group of devices in the external charging system can be avoided by setting SMR 240 OFF. Accordingly, the lifetime of the group of devices in the external charging system can be increased. Similarly, by setting SMR 115 OFF in an external charging mode, the electric power for external charging can be prevented from being applied to the group of devices in the vehicle running system downstream of SMR 115. Accordingly, the lifetime of the group of devices in the vehicle running system can be prevented from being reduced by the effect of external charging.

Charger 200 converts the AC power supplied from external power supply 260 into DC power for charging power storage device 110, based on a control signal PWE from ECU 300. Charger 200 includes smoothing capacitors C1 and C2, an AC/DC conversion unit 202 and a DC/DC conversion unit 204.

AC/DC conversion unit 202 converts the AC power between power lines ACL1 and ACL2 into DC power for output to power line PL4 and ground line NL4. Smoothing capacitor C1 is connected between power line PL4 and ground line NL4.

DC/DC conversion unit 204 converts the DC power on power line PL4 into the charging electric power for power storage device 110 by the DC voltage conversion operation for output to power line PL2 and ground line NL2. Smoothing capacitor C1 is connected between power line PL2 and ground line NL2.

Figure 3:
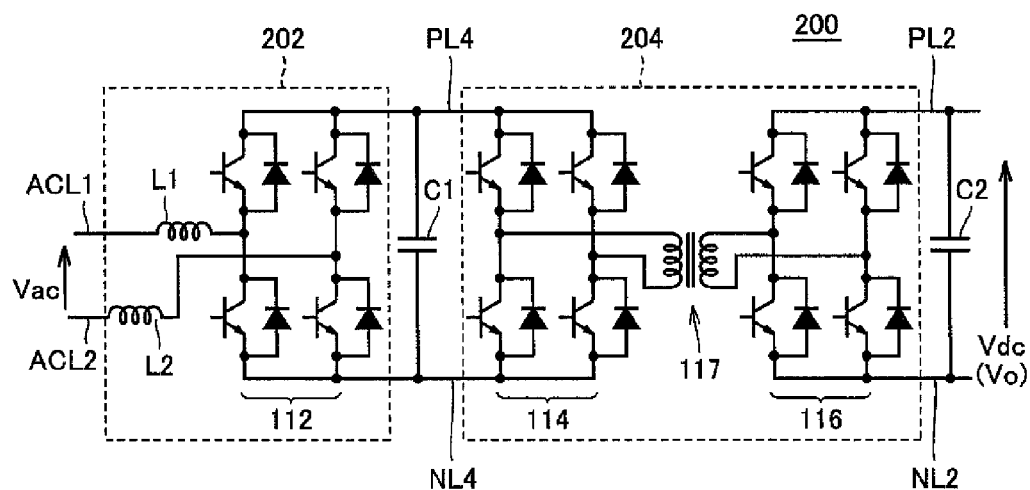
FIG. 3 is a circuit diagram of an exemplified configuration of a charger for external charging shown in FIG. 1.

FIG. 3 represents an example of a configuration of charger 200.

Referring to FIG. 3, AC/DC conversion unit 202 includes reactors L1 and L2, and a bridge circuit 112.

Reactor L1 is connected in series with power line ACL1. Reactor L2 is connected in series with power line ACL2.

Bridge circuit 112 converts AC voltage Vac between power lines ACL1 and ACL2 into DC voltage for output to power line PL4 and ground line NL4 by the on/off control of the power semiconductor switching element. Smoothing capacitor C1 is connected between power line PL4 and ground line NL4.

DC/DC conversion unit 204 includes bridge circuits 114 and 116, and a transformer 117.

Bridge circuit 114 converts the DC voltage of power line PL4 and ground line NL4 into AC power for output to the primary side of transformer 117 by the on/off control of the power semiconductor switching element. Transformer 117 converts the AC voltage of the primary side according to a predetermined primary/secondary side winding ratio for output to the secondary side.

Bridge circuit 116 converts the AC voltage of the secondary side of transformer 117 into DC voltage, and outputs the converted DC voltage Vdc to power line PL2 and ground line NL2 by the on/off control of the power semiconductor switching element.

Accordingly, AC voltage Vac (for example 100 VAC) from external power supply 260 can be converted into DC voltage Vdc for charging power storage device 110 while ensuring insulation between external power supply 260 and power storage device 110. For the on/off control of the power semiconductor switching element for AC/DC conversion or DC/AC conversion at bridge circuits 112, 114 and 116, the well-known control is applicable. Therefore, detailed description will not be provided.

Referring to FIG. 1 again, the power supply system further includes, as the configuration of the low voltage system (auxiliary machine system), an auxiliary battery 180 corresponding to "sub power storage device", auxiliary machine load 190, and DC/DC converter 230 corresponding to "power converter".

Auxiliary battery 180 is typically formed of a lead battery. The output voltage from auxiliary battery 180 is approximately 12V, for example, lower than the output voltage of power storage device 110.

Auxiliary machine load 190 includes, for example, the lamp group, wiper, heater, audio, navigation system, and the like.

DC/DC converter 230 is connected between power line PL2, ground line NL2, and power line PL3. Voltage Vo of power line PL2 is detected by a voltage sensor 206. In the configuration of FIG. 1, voltage Vo detected by voltage sensor 206 corresponds to input voltage Vdin of DC/DC converter 230.

DC/DC converter 230 is configured to down-convert the DC voltage on power line PL2 connected to smoothing capacitor C2 for output onto power line PL3 based on a control signal PWD from ECU 300. Through power line PL3, electric power is supplied to the low voltage system of the entire vehicle such as auxiliary battery 180, auxiliary machine load 190, ECU 300, and the like.

DC/DC converter 230 is typically a switching regulator including a power semiconductor switching element (not shown), having the control function of output voltage Vax and/or output current Tax. The well-known arbitrary circuit configuration can be applied for DC/DC converter 230.

In an external charging mode, DC/DC converter 230 converts the DC power based on the electric power supply from external power supply 260, output onto power line PL2 by charger 200, into the charging power for auxiliary battery 180.

Although not shown in FIG. 1, a DC/DC converter for charging auxiliary battery 180 may be arranged, in addition to DC/DC converter 230 operating in association with the external charging system. For example, a DC/DC converter configured to down-convert the DC voltage on power line PL2 for output onto power line PL3 may be arranged between power line PL1 and power line PL3, for example.

ECU 300 outputs a control signal for the control of SMR 115, PCU 120, charger 200, DC/DC converter 230, CHR 240, and the like.

ECU 300 receives the detection values of voltage VB1, temperature TB1 and current IB1 from a sensor (not shown) in power storage device 110. ECU 300 calculates the state of charge (SOC) of power storage device 110 based on at least one of these detection values. ECU 300 also receives the detection value of at least one of voltage VB2, temperature TB2 and current IB2 from a sensor (not shown) included in auxiliary battery 180. ECU 300 can sense the output state of auxiliary battery 180 based on the detection value of auxiliary battery 180.

In the power supply system shown in FIG. 1, the state of charge of power storage device 110 is monitored by ECU 300 in an external charging mode. When a predetermined charging end condition is established by the SOC attaining a predetermined level (fully charged level or a level designated in advance), or at the elapse of a predetermined charging time, ECU 300 instructs the external charging to end.

When the external charging ends, charger 200 ceases the operation of converting the electric power from external power supply 260 into the charging power for power storage device 110. Then, CHR 240 is set OFF, whereby power storage device 110 is disconnected from power line PL2 and ground line NL2. Furthermore, the relay (not shown) in charge cable 280 is set OFF, whereby external power supply 260 is electrically disconnected from charger 200.

When external charging is to be ended, it is necessary to discharge the stored charge in smoothing capacitors C1 and C2 in charger 200 from the standpoint of safety. Generally a discharging circuit not shown (for example, constituted of a discharge resistance and discharge relay) is provided for smoothing capacitors C1 and C2.

In the present embodiment, smoothing capacitors C1 and C2 are discharged by converting the stored charge in smoothing capacitors C1 and C2 into the charging power for auxiliary battery 180 by DC/DC converter 230. At this stage, AC/DC conversion unit 202 is stopped at charger 200. In contrast, DC/DC conversion unit 202 operates to convert the DC power on power line PL4 into DC power on power line PL2. Accordingly, the stored charge in smoothing capacitor C1 is discharged towards power line PL2 connected to DC/DC converter 230.

Figure 4:
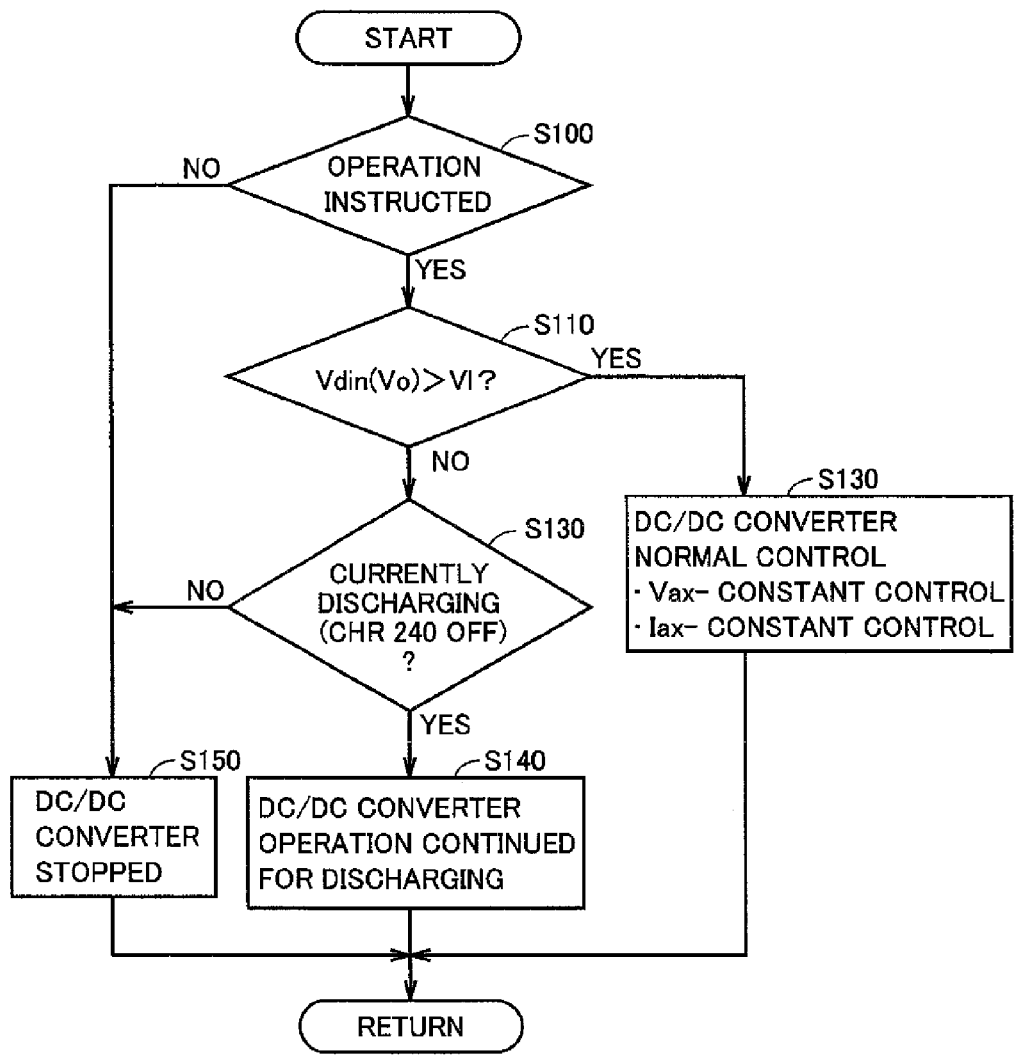
FIG. 4 is a flowchart of the control process of a DC/DC converter in the power supply system of the electric powered vehicle according to the first embodiment.

FIG. 4 is a flowchart of the control process of DC/DC converter 230 in the power supply system of the electric powered vehicle according to the first embodiment. The process of each step shown in FIG. 4 is executed periodically by software processing or hardware processing through ECU 300.

Referring to FIG. 4, at step S100, ECU 300 determines whether generation of an operation instruction of DC/DC converter 230 is required or not. An operation instruction of DC/DC converter 230 is generated when auxiliary battery 180 is to be charged in an external charging mode, or when the stored charged in the smoothing capacitor is to be discharged at the end of external charging, as will be described afterwards.

When an operation instruction of DC/DC converter 230 is not generated (NO determination at S100), ECU 300 proceeds to step S150 to stop DC/DC converter 230.

In contrast, when an operation instruction of DC/DC converter 230 is generated (YES determination at S100), ECU 300 proceeds to step S110 to compare voltage Vo on power line PL2 detected by voltage sensor 206, i.e. input voltage Vdin of DC/DC converter 230, with a determination voltage V1.

Generally, DC/DC converter 230 has the rate of the input voltage range determined. Since degradation in the conversion efficiency becomes a concern when outside this rated input voltage range, DC/DC converter 230 is generally controlled such that its operation is stopped. For example, determination voltage V1 is defined corresponding to the lower limit of the rated input voltage range.

When voltage Vo (Vdin) is higher than determination voltage V1 (YES determination at S110), ECU 300 proceeds to step S130 to cause DC/DC converter 230 to operate under normal control. In normal control, DC/DC converter 230 operates such that output voltage Vax or output current Tax is regulated at the target value for the purpose of stabilizing the charging of auxiliary battery 180. In other words, DC/DC converter 230 converts the power on power line PL2 into the charging power for auxiliary battery 180 for output onto power line PL3 under constant current control or constant voltage control.

When voltage Vo (Vdin) is lower than determination voltage V1 (YES determination at S110), ECU 300 proceeds to step S130 to determine whether currently discharging or not. Since CHR 240 is set OFF when charging of power storage device 110 is completed, CHR 240 is OFF in the event of discharging of the smoothing capacitor being required due to the ending of external charging. Therefore, the determination at step S130 can be made depending upon whether CHR 240 is OFF or not.

In a discharging mode of the smoothing capacitor (YES determination at S130), ECU 300 proceeds to step S140 to cause DC/DC converter 230 to continue operating for discharging, without stopping, even if input voltage Vdin is lower than the rated input voltage range.

At step S140, DC/DC converter 230 executes control such that output current Iax of DC/DC converter 230 becomes maximum in order to end discharging promptly instead of the normal control such as at step S130. DC/DC converter 230 is preferably operated with the target value of output current Tax set at the rated maximum current, or under the state where the duty of the switching element of the DC/DC converter is fixed at the maximum value. Accordingly, discharging of smoothing capacitors C1 and C2 can be completed promptly. Since only the electric power of the discharging subject remains on power line PL2 when CHR 240 is OFF, it is expected that output current Iax will not be excessive even if DC/DC converter 230 is operated at the maximum current.

When CHR 240 is ON (NO determination at S130), ECU 300 proceeds to step S150 to stop DC/DC converter 230. In other words, when in a non-discharging mode, DC/DC converter 230 is stopped as in the normal case when input voltage Vdin is lower than the rated input voltage range.

Thus, at the power supply device of the electric powered vehicle according to the first embodiment, when CHR 240 is OFF, the stored charge in the smoothing capacitor is converted into charging power for auxiliary battery 180 by causing DC/DC converter 230 to operate even if input voltage Vdin is lower than the normal range (rated input voltage range). Thus, the stored charge in the smoothing capacitor can be discharged more efficiently as compared to the case where discharging is effected simply by a discharge circuit. The discharging of the smoothing capacitor can be completed reliably by combining the operation of a discharge circuit not shown at the final stage of discharging.

At the low voltage range (Vdin<V1) the discharging of the smoothing capacitor can be completed quickly by operating DC/DC converter 230 under conditions differing from those of normal control.

(Modification of First Embodiment)

Figure 5:
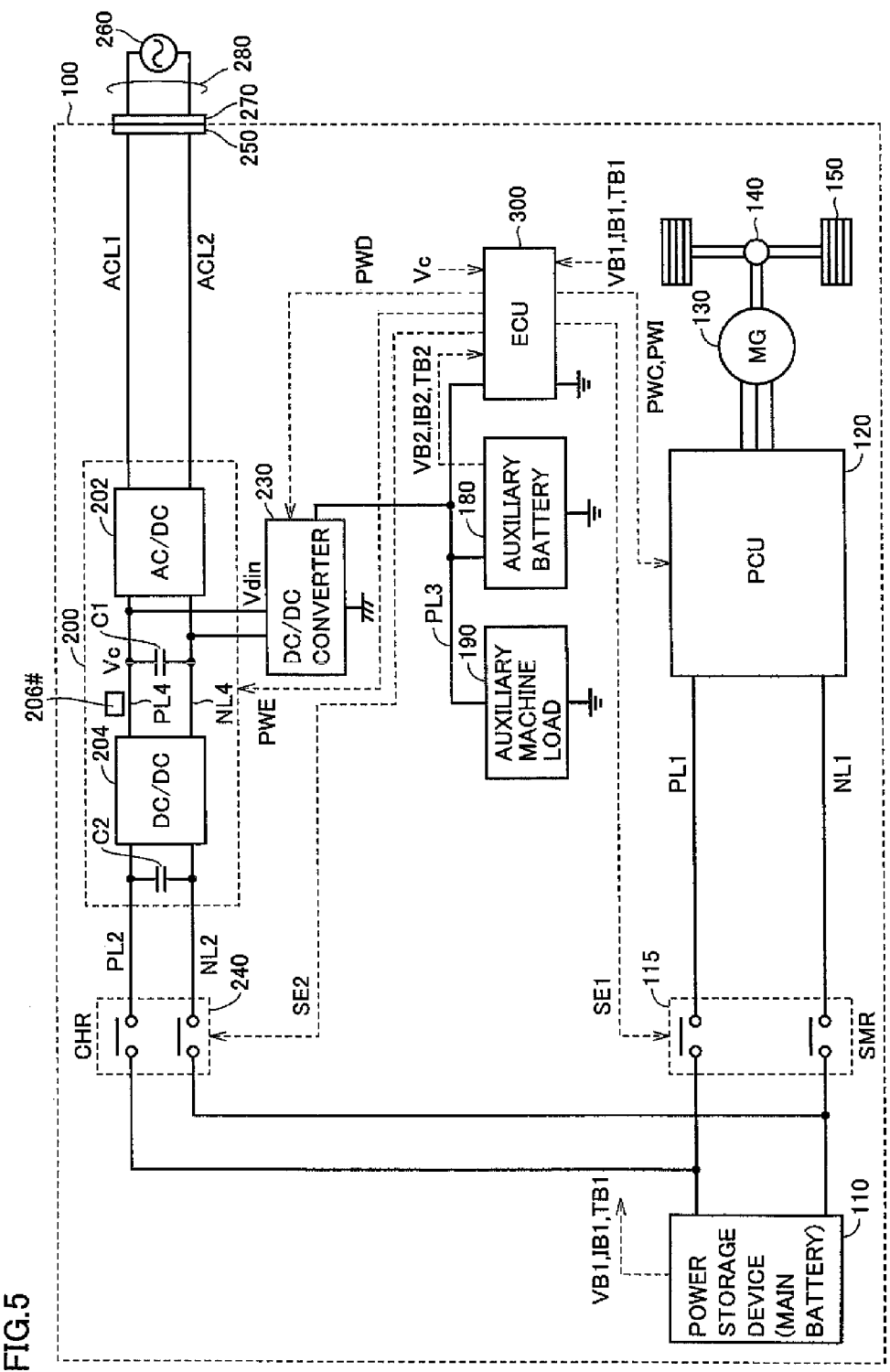
FIG. 5 is a block diagram representing a configuration of an electric powered vehicle including a power supply system according to a modification of the first embodiment.

FIG. 5 is a block diagram representing a configuration of an electric powered vehicle including a power supply system according to a modification of the first embodiment.

Referring to FIG. 5, the arrangement of DC/DC converter 230 in the modification of the first embodiment differs from that of the first embodiment shown in FIG. 1. DC/DC converter 230 is connected between power lines PL4 and ground line NL4 connected to smoothing capacitor C1 and power line PL3. A voltage sensor 206# is arranged to detect voltage Vc on power line PL2. In the configuration of FIG. 5, voltage Vc detected by voltage sensor 206 corresponds to input voltage Vdin of DC/DC converter 230. The configuration of the remaining elements shown in FIG. 5 is similar to those of FIG. 1. Therefore, detailed description will not be repeated.

In the power supply system shown in FIG. 5, AC/DC conversion unit 202 stops at charger 200 when external charging ends. Accordingly, the operation of converting the power from external power supply 260 into the charging power of power storage device 110 is stopped. Furthermore, DC/DC conversion unit 202 operates such that the DC power on power line PL2 is converted into the DC voltage on power line PL4. Accordingly, the stored charge in smoothing capacitor C2 is discharged onto power line PL1 connected to DC/DC converter 230.

The power supply system shown in FIG. 5 allows the control of DC/DC converter 230 according to the flowchart shown in FIG. 4.

Therefore, in the power supply system according to the modification of the first embodiment, the charging power for auxiliary battery 180 can be generated by the stored charge in smoothing capacitors C1 and C2, likewise with the first embodiment, when external charging ends. By the connection of DC/DC converter 230 with a power line to which any of the smoothing capacitors constituting charger 200 is connected, discharging of the smoothing capacitor can be executed when external charging ends using DC/DC converter 230, likewise with the first embodiment.

Second Embodiment

Figure 6:
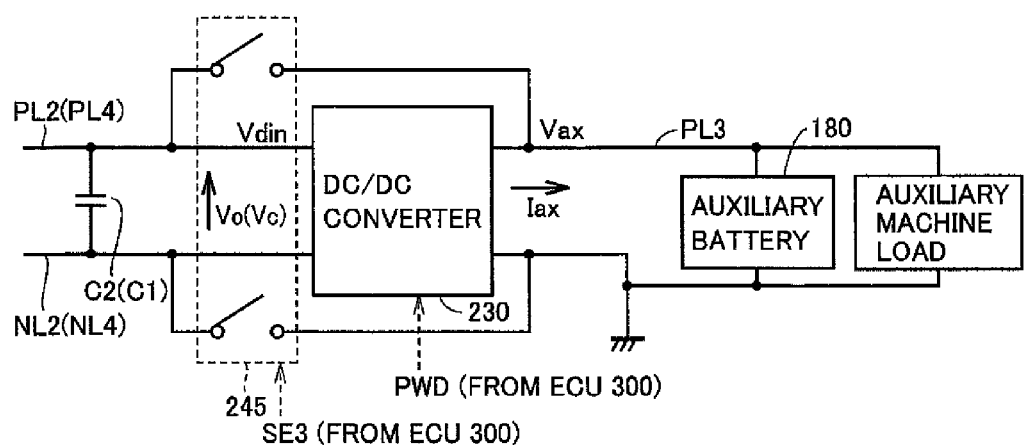
FIG. 6 is a block diagram of the main elements of a configuration of the power supply system according to the electric powered vehicle of the second embodiment.

FIG. 6 is a block diagram representing the main elements of a configuration of the power supply system of an electric powered vehicle according to the second embodiment.

Referring to FIG. 6, the power supply system of the electric powered vehicle according to the second embodiment differs from the configuration of the first embodiment and modification thereof in that a relay 245 is further arranged for bypassing DC/DC converter 230. The configuration of the remaining elements in the power supply system is similar to that of the power supply system of the electric powered vehicle according to the first embodiment or modification thereof. Therefore, description thereof will not be repeated.

Referring to FIG. 6, relay 245 is connected between power line PL2 (or PL4) to which smoothing capacitor C2 (or C1) is connected and power line PL3, and between ground line NL2 (or NL4) to which smoothing capacitor C2 (or C1) is connected and ground line NL3. In other words, relay 245 is inserted between power line PL2 (PL4), ground line NL2 (NL4) and power line PL3, ground line NL3, connected at an electrical path bypassing DC/DC converter 230. Relay 245 is controlled by a control signal SE3 from ECU 300.

According to the configuration of FIG. 6, the ON of relay 245 allows the stored charge in the smoothing capacitor to be directly discharged from power line PL2 (or PL4) to power line PL3 without the intervening of DC/DC converter 230.

Figure 7:
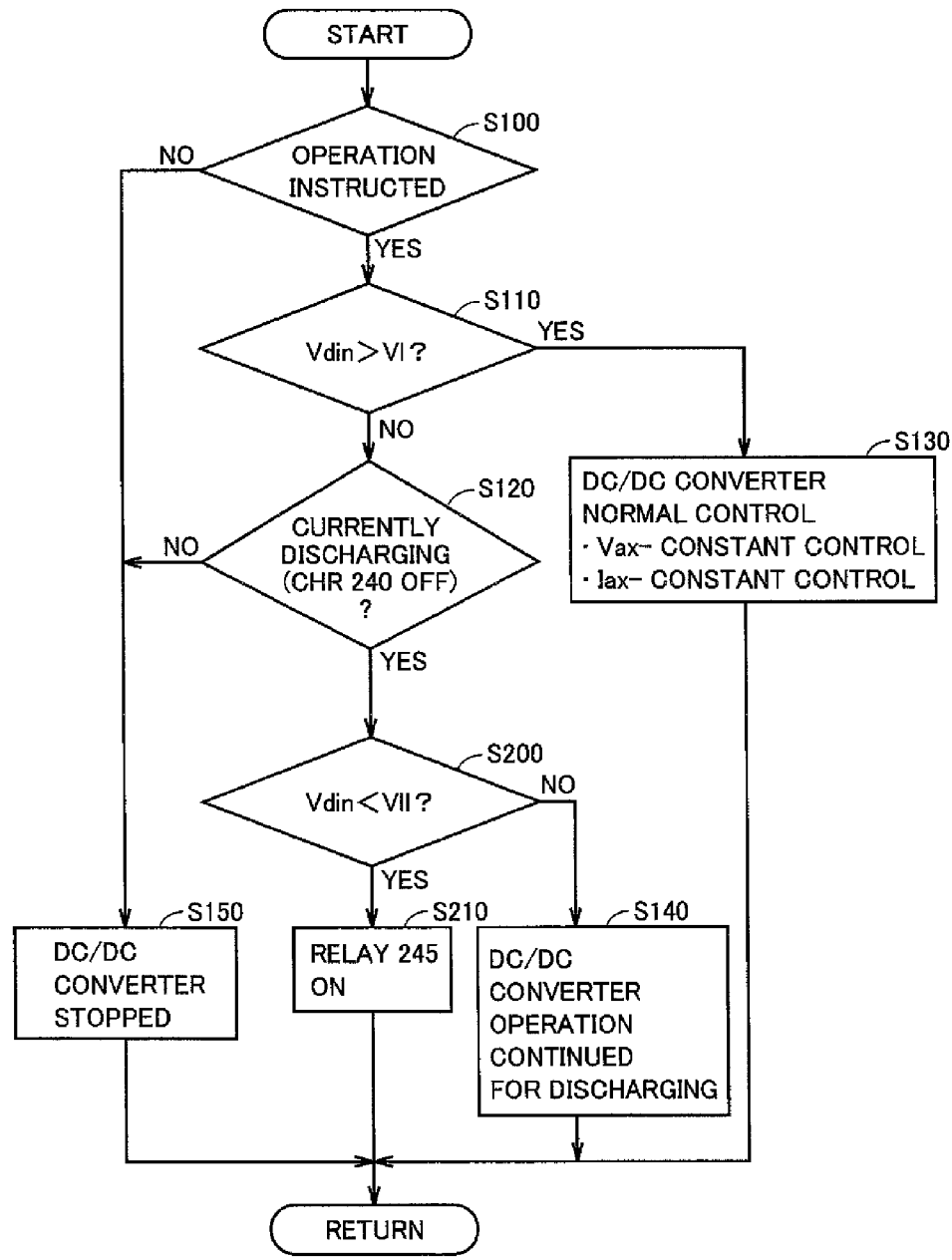
FIG. 7 is a flowchart of a control process of a DC/DC converter in the power supply system of the electric powered vehicle according to the second embodiment.

FIG. 7 is a flowchart of a control process of a DC/DC converter in the power supply system of the electric powered vehicle according to the second embodiment.

Comparing FIG. 7 with FIG. 4, the control of the DC/DC converter according to the second embodiment differs in that ECU 300 executes steps S200 and S210 in response to a YES determination at step S120. The process of the remaining steps is similar to that of FIG. 4. Therefore, detailed description will not be repeated.

In a YES determination at step S120, i.e. when input voltage Vdin of DC/DC converter 230 is lower than determination voltage Vl and currently in a discharging state, ECU 300 proceeds to step S200. Input voltage Vdin is equivalent to voltage Vo (FIG. 1) detected by voltage sensor 206, or voltage Vc (FIG. 5) detected by voltage sensor 206#.

At step S200, ECU 300 compares input voltage Vdin with determination voltage Vll (Vll<Vl). When input voltage Vdin is lower than determination voltage Vll (YES determination at step S200), the possibility of excessive current flowing is low even when relay 245 is ON to execute discharging since the stored charge in the smoothing capacitor is low. Therefore, ECU 300 proceeds to step S210 to set relay 245 ON. As a result, the charge in smoothing capacitor C2 (or C1) is directly discharged towards power line PL3 without the intervening of DC/DC converter 230.

In contrast, when input voltage Vdin is higher than determination voltage Vll (NO determination at S200), ECU 300 executes discharging of smoothing capacitor C2 (or C1) by DC/DC converter 230 according to a step S140 similar to that of FIG. 4.

According to the power supply system of the electric powered vehicle of the second embodiment, when the stored charge in the smoothing capacitor becomes low, the discharging of the smoothing capacitor can be ended more quickly by setting relay 245 ON. Although further reduction of the efficiency of DC/DC converter 230 is of a concern in the region where input voltage Vdin is particularly low, discharging is executed by relay 245 so as to bypass DC/DC converter 230, avoiding execution of power conversion by DC/DC converter 230 at such a region.

Relay 245 may be operated when sensing a collision at electric powered vehicle 100. In the case where ECU 300 detects that a collision has occurred at electric powered vehicle 100 based on the output of a G sensor or the like, it is preferred that discharging of the smoothing capacitor is executed quickly for the sake of safety. Preferably, by setting relay 245 ON regardless of input voltage Vdin of DC/DC converter 230 when collision at electric powered vehicle 100 is sensed, the discharging of the smoothing capacitor is executed reliably and rapidly by setting ON relay 245.

Third Embodiment

Figure 8:
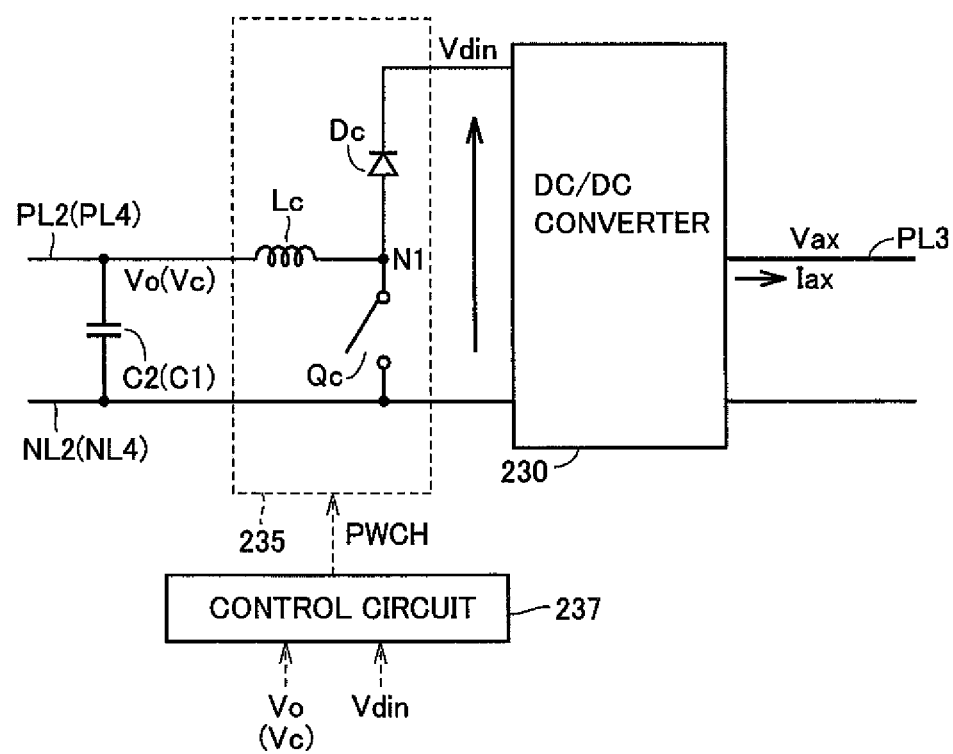
FIG. 8 is a block diagram of the main elements of a configuration of a power supply system of an electric powered vehicle according to the third embodiment.

FIG. 8 is a block diagram representing the main elements in the configuration of a power supply system of an electric powered vehicle according to a third embodiment.

Referring to FIG. 8, the power supply system of the electric powered vehicle according to the third embodiment differs from the structure of the first embodiment and modification thereof in that a boost circuit 235 is further provided. Boost circuit 235 is arranged between power line PL2 (or PL4) and ground line NL2 (or NL4) and the input side of DC/DC converter 230. The configuration of the remaining elements in the power supply system is similar to that of the power supply system of the electric powered vehicle according to the first embodiment and modification thereof. Therefore, description will not be repeated.

Boost circuit 235 includes a reactor Lc, a diode Dc, and a switching element Qc. Reactor Lc connected between power line PL2 (or PL4) and a node N1. Diode Dc is connected between node N1 and the input terminal of DC/DC converter 230. Switching element Qc is connected between node N1 and ground line NL2 (or NL4). The ON/OFF of switching element Qc is controlled by a control signal PWCH from control circuit 237.

Boost circuit 235 has the configuration of a general boosting chopper. Boost circuit 235 has the voltage conversion ratio between voltage Vo (or Vc) and input voltage Vdin of DC/DC converter 230 controlled according to the duty ratio of switching element Qc (the ratio of ON period to switching period).

Diode Dc is connected with the direction from node N1 towards the input terminal of DC/DC converter 230 as the forward direction. Therefore, a current in the opposite direction from DC/DC converter 230 to power line PL2 (or PL4) will not flow. When boost circuit 235 is stopped, voltage Vo (Vc) on power line PL2 (PL4) is applied to DC/DC converter 230 via diode Dc.

The operation of boost circuit 235 allows input voltage Vdin of DC/DC converter 230 to be placed within the rated input voltage range even if voltage Vo (Vc) becomes lower than determination voltage Vl when the smoothing capacitor is being discharged.

Control circuit 237 generates a control signal PWCH for switching element Qc such that a duty ratio corresponding to the voltage conversion ratio to achieve Vdin>Vl is realized based on the detection values of voltage Vo (Vc) and input voltage Vdin.

Figure 9:
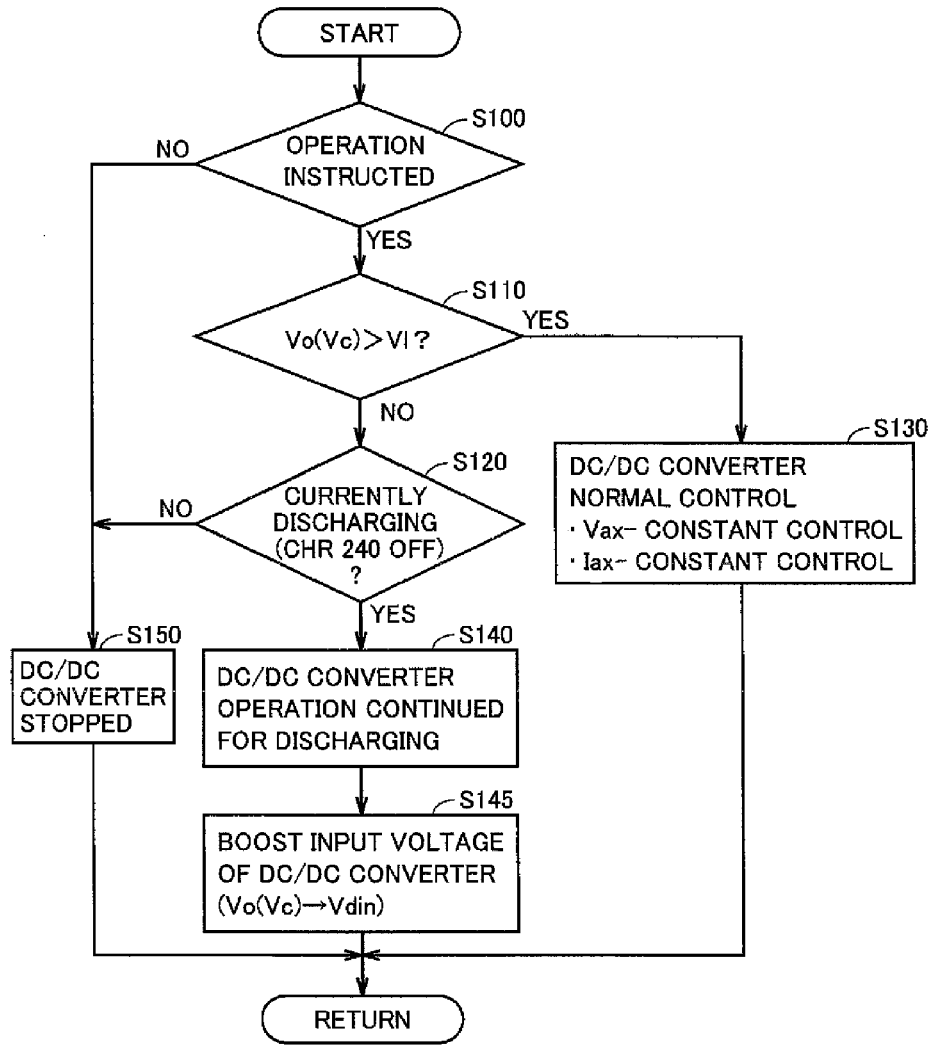
FIG. 9 is a flowchart of a control process of a DC/DC converter in the power supply system of the electric powered vehicle according to the third embodiment.

FIG. 9 is a flowchart of a control process of a DC/DC converter in the power supply system of the electric powered vehicle according to the third embodiment.

Comparing FIG. 9 with FIG. 4 in the control of the DC/DC converter according to the third embodiment, following a YES determination at step S120, step S145 is further executed in addition to step S140 (FIG. 4) of continuing the operation of the DC/DC converter for discharging. The process at the remaining steps is similar to that of FIG. 4. Therefore, detailed description thereof will not be repeated.

At step S145, ECU 300 causes boost circuit 235 to operate to boost the input voltage of DC/DC converter 230. Accordingly, DC/DC converter 230 can be made to operate in the normal input voltage range even in a region where voltage Vo (Vc) is reduced. Therefore, the stored charge in the smoothing capacitor can be converted into the charging power for auxiliary battery 180 without significant reduction in the conversion efficiency. Accordingly, the discharging of the smoothing capacitor can be executed further efficiently.

Moreover, the configuration of the power supply system of the electric powered vehicle according to the third embodiment shown in FIG. 8 and the configuration of the power supply system of the electric powered vehicle according to the second embodiment shown in FIG. 6 can be combined. Specifically, in the configuration shown in FIG. 8, relay 245 can be arranged to bypass both boost circuit 235 and DC/DC converter 230. In other words, relay 245 shown in FIG. 6 can be connected between power line PL2 (or PL1) and power line PL3, and between ground line NL2 (or NL4) and ground line NL3.

Figure 10:
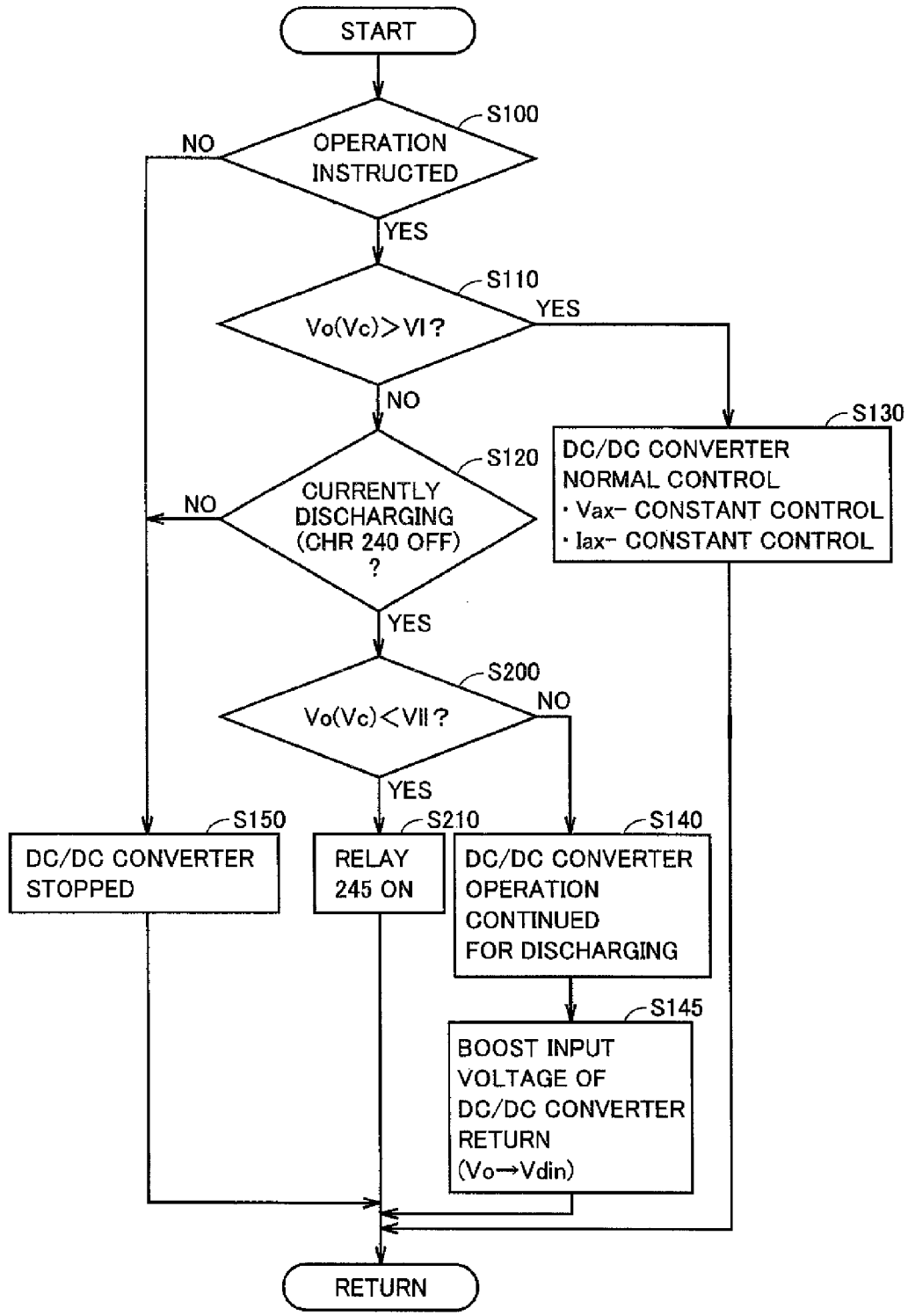
FIG. 10 is a flowchart of a control process of a DC/DC converter in the power supply system of the electric powered vehicle based on a combination of the second and third embodiments.

FIG. 10 is a flowchart of a control process of the DC/DC converter in the power supply system of an electric powered vehicle based on a combination of the second and third embodiments.

Comparing FIG. 10 with FIG. 4 in the control of the DC/DC converter at the power supply system based on the combination of the second and third embodiments, ECU 300 compares input voltage Vdin with determination voltage Vll (Vll<Vl) by a step S200 similar to that of FIG. 7 in response to a YES determination at step S120.

When input voltage Vdin is lower than determination voltage Vll (YES determination at step S200), ECU 300 sets relay 245 ON by a step S210 similar to that of FIG. 7. As a result, the charge in smoothing capacitor C2 (or C1) is discharged directly onto power line PL3 at the region where the stored charge in the smoothing capacitor is low, likewise with the second embodiment.

When input voltage Vdin is higher than determination voltage Vll (NO determination at S200), ECU 300 executes step S140 and S145, likewise with FIG. 9. Accordingly, DC/DC converter 230 is operated at the normal input voltage range to cause the stored charge in the smoothing capacitor to be converted into the charging power for auxiliary battery 180.

According to a power supply system of an electric powered vehicle based on a combination of the second and third embodiments, the discharging of a smoothing capacitor in charger 200 at the time of ending external charging can be executed efficiently and completed promptly.

The configuration of power line PL1 and et seq. (vehicle running system) in the present embodiment and modification thereof is not limited to that depicted. In other words, the configuration can be applied in common to an electric powered vehicle incorporating an electric motor for generating wheel driving power such as an electric car, hybrid vehicle, fuel cell automobile, and the like, as mentioned before.

Furthermore, it is intended that an arbitrary circuit configuration can be applied to charger 200 for external charging as long as power conversion in the required range set forth above is allowed. For example, although an insulation type charging device employing a transformer 117 has been shown in FIG. 3, a non-insulation type charging device may be employed.

It should be understood that the embodiments disclosed herein are illustrative and non-restrictive in every respect. The scope of the present invention is defined by the terms of the claims, rather than the description set forth above, and is intended to include any modifications within the scope and meaning equivalent to the terms of the claims.

INDUSTRIAL APPLICABILITY

The present invention is applicable to an electric powered vehicle incorporating a main power storage device (high voltage) for feeding power to a traction motor, capable of charging by an external power supply, and a sub-power storage device for feeding power to an auxiliary machine (low voltage).

REFERENCE SIGNS LIST

100 electric powered vehicle; 110 power storage device; 112, 114, 116, 114, 116 bridge circuit; 115 system main relay (SMR); 117 transformer; 121 converter; 122 inverter; 130 motor, generator; 140 power transmission gear; 150 driving wheel; 180 auxiliary battery; 190 auxiliary machine load; 200 charger; 202 AC/DC conversion unit; 204 DC/DC conversion unit; 206, 206# voltage sensor; 230 DC/DC converter; 235 boost circuit; 237 control circuit; 240 charge relay (CHR); 245 relay; 250 charge inlet; 260 external power supply; 270 charge connector; 280 charge cable; 300 control device; ACL1, ACL2, HPL, PL1, PL2, PL3, PL4 power line; C1, C2, C3, C4, C3 smoothing capacitor; Dc diode (boost circuit); NL1, NL2, NL3, NL4 ground line; IB1, IB2 current (power storage device); Iax output current (DC/DC converter); L1, L1, L2, L2, Lc reactor; N1 node (boost circuit); PWC, PWCH, PWD, PWE, PWI, SE1, SE2, SE3 control signal; Qc switching element (boost circuit); TB1, TB2 temperature (power storage device); VB1, VB2 voltage (power storage device); Vc, Vo voltage; Vac AC voltage; Vax output voltage (DC/DC converter); Vdc DC voltage; Vdin input voltage (DC/DC converter); Vl, Vll determination voltage.

The invention claimed is:

1. A power supply system for an electric powered vehicle, comprising:
    a main power storage device for storing electric power input/output with respect to an electric motor generating vehicle driving power,
    a charger configured including a smoothing capacitor, for converting electric power from an external power supply into charging power for said main power storage device,
    a sub-power storage device having an output voltage lower than the output voltage of said main power storage device,
    a power converter provided between said charger and said sub-power storage device, configured to convert the power on a first power line connected to said smoothing capacitor into charging power for said sub-power storage device, and
    a control device for controlling an operation of said power converter based on a voltage on said first power line,
    said control device, in an external charging mode by said charger, causing said power converter to operate to charge said sub-power storage device when the voltage on said first power line is higher than a first determination voltage, and stopping said power converter when the voltage on said first power line is lower than said first determination voltage, and in a discharging mode of said smoothing capacitor at an end of said external charging, causing said power converter to operate to convert stored charge in said smoothing capacitor into charging power for said sub-power storage device even when the voltage on said first power line becomes lower than said first determination voltage.

2. The power supply system for an electric powered vehicle according to claim 1, wherein said control device causes said power converter to operate such that an output voltage or output current to said sub-power storage device is constant when the voltage on said first power line is higher than said first determination voltage, and causes said power converter to operate such that said output current is maximum when said power converter is to be operated in an event of the voltage on said first power line being lower than said first determination voltage.

3. The power supply system for an electric powered vehicle according to claim 1, further comprising a second relay between said first power line and said sub-power storage device, connected bypassing said power converter,
    wherein said control device sets said second relay ON when the voltage on said first power line is lower than a second determination voltage that is lower than said first determination voltage in said discharging mode.

4. The power supply system for an electric powered vehicle according to claim 1, further comprising a boost circuit for boosting the voltage on said first power line for output to an input side of said power converter, wherein said control device provides control such that an input voltage of said power converter becomes higher than said first determination voltage by said boost circuit when said power converter is to be operated in an event of the voltage on said first power line being lower than said first determination voltage.

5. The power supply system for an electric powered vehicle according to claim 1, wherein
said smoothing capacitor includes
a first capacitor connected to said first power line, and
a second capacitor connected to a second power line different from said first power line,
said charger includes a power conversion unit for carrying out DC power conversion between said first power line and said second power line, and
said power conversion unit operates to convert power on said second power line for output to said first power line in said discharging mode.

6. The power supply system for an electric powered vehicle according to claim 1, wherein said first determination voltage is determined corresponding to a lower limit of a rated input voltage range of said power converter.

7. A method of controlling a power supply system for an electric power vehicle incorporating an electric motor that generates vehicle driving power,
said power supply system including
a main power storage device for storing electric power input/output with respect to said electric motor,
a charger configured including a smoothing capacitor, for converting electric power from an external power supply into charging power for said main power storage device,
a sub-power storage device having an output voltage lower than the output voltage of said main power storage device, and
a power converter provided between said charger and said sub-power storage device, configured to convert the power on a first power line connected to said smoothing capacitor into charging power for said sub-power storage device,
said method of controlling comprising the steps of:
comparing a voltage on said first power line with a first determination voltage when operation of said power converter is instructed,
causing said power converter to operate to charge said sub-power storage device when the voltage on said first power line is higher than the first determination voltage,
causing said power converter to operate to convert stored charge in said smoothing capacitor into charging power for said sub-power storage device in a discharging mode of said smoothing capacitor at an end of external charging, when the voltage on said first power line is lower than said first determination voltage, and
stopping said power converter in a mode other than said discharging mode when the voltage on said first power line is lower than said first determination voltage.

8. The method of controlling a power supply system for an electric powered vehicle according to claim 7, wherein
in said step of charging, said power converter is operated such that output voltage or output current to said sub-power storage device is constant, and
in said step of converting, said power converter is caused to operate such that said output current is maximum.

9. The method of controlling a power supply system for an electric powered vehicle according to claim 7, said power supply system further including a second relay between said first power line and said sub-power storage device, connected bypassing said power converter,
said method of controlling further comprising the step of setting said second relay ON when a voltage on said first power line is lower than a second determination voltage that is lower than said first determination voltage in said discharging mode.

10. The method of controlling a power supply system for an electric powered vehicle according to claim 7, said power supply system further including a boost circuit for boosting the voltage on said first power line for output to an input side of said power converter,
said method of controlling further comprising the step of controlling such that input voltage of said power converter becomes higher than said first determination voltage by said boost circuit when said power converter is to be operated in an event of the voltage on said first power line being lower than said first determination voltage.

11. An electric powered vehicle allowing charging by an external power supply, said electric powered vehicle comprising:
an electric motor generating vehicle driving power,
a main power storage device for storing electric power input/output with respect to said electric motor,
a charger configured including a smoothing capacitor, for converting electric power from said external power supply into charging power for said main power storage device,
a sub-power storage device having an output voltage lower than the output voltage of said main power storage device,
a power converter provided between said charger and said sub-power storage device, configured to convert the power on a first power line connected to said smoothing capacitor into charging power for said sub-power storage device, and
a control device for controlling an operation of said power converter based on a voltage on said first power line,
said control device, in an external charging mode by said charger, causing said power converter to operate to charge said sub-power storage device when the voltage on said first power line is higher than a first determination voltage, and stopping said power converter when the voltage on said first power line is lower than said first determination voltage, and in a discharging mode of said smoothing capacitor at an end of said external charging, causing said power converter to operate to convert stored charge in said smoothing capacitor into charging power for said sub-power storage device even when the voltage on said first power line becomes lower than said first determination voltage.

12. The electric powered vehicle according to claim 11, wherein said control device causes said power converter to operate such that an output voltage or output current to said sub-power storage device is constant when the voltage on said first power line is higher than said first determination voltage, and causes said power converter to operate such that said output current is maximum when said power converter is to be operated in an event of the voltage on said first power line being lower than said first determination voltage.

13. The electric powered vehicle according to claim 11, wherein
said smoothing capacitor includes
a first capacitor connected to said first power line, and
a second capacitor connected to a second power line different from said first power line,
said charger includes a power conversion unit for carrying out DC power conversion between said first power line and said second power line, and said power conversion unit operates to convert power on said second power line for output to said first power line in said discharging mode.

14. The electric powered vehicle according to claim 11, further comprising a second relay between said first power line and said sub-power storage device, connected bypassing said power converter, wherein said control device sets said second relay ON when the voltage on said first power line is lower than a second determination voltage that is lower than said first determination voltage in said discharging mode.

15. The electric powered vehicle according to claim 11, further comprising a boost circuit for boosting the voltage on said first power line for output to said power converter, wherein said control device provides control such that an input voltage of said power converter becomes higher than said first determination voltage by said boost circuit when said power converter is to be operated in an event of the voltage on said first power line being lower than said first determination voltage.

* * * * *